United States Patent
Piper et al.

(10) Patent No.: US 11,106,285 B1
(45) Date of Patent: Aug. 31, 2021

(54) KEYBOARD CONTAINMENT SYSTEM

(71) Applicant: Pioneer Square Brands, Inc., Seattle, WA (US)

(72) Inventors: Brian Lewis Piper, Seattle, WA (US); Michael Cooper Ferren, Camus, WA (US)

(73) Assignee: PIONEER SQUARE BRANDS, INC., McLean, VA (US)

(*) Notice: Subject to any disclaimer, the term of this patent is extended or adjusted under 35 U.S.C. 154(b) by 0 days.

(21) Appl. No.: 17/010,130

(22) Filed: Sep. 2, 2020

(51) Int. Cl.
*G06F 3/02* (2006.01)
*H01H 13/86* (2006.01)

(52) U.S. Cl.
CPC .......... *G06F 3/0202* (2013.01); *H01H 13/86* (2013.01)

(58) Field of Classification Search
CPC ........ G06F 3/02; G06F 3/0202; G06F 3/0233; G06F 1/1624; G06F 1/1616; G06F 1/1632; G06F 1/1654; G06F 1/1656; G06F 2200/1633; H01H 13/86; H01H 2231/00; H01H 2231/002; H01H 2231/012; H01H 2231/022; H01H 2223/00; H01H 2223/01; H01H 2223/012; H01H 2223/018; H01H 2223/02; H01H 2223/026; H01H 2223/028; H01H 2223/03; H01H 2223/034; H01H 2223/04; H01H 2223/042; H01H 2223/044; H01H 2223/046; H01H 2227/00; A45C 13/00; A45C 13/002; A45C 13/005; A45C 13/34; A45C 13/04; A45C 13/06; A45C 2011/003; A45C 1/00; A45C 9/00; G06K 7/10
USPC ..................................... 345/168; 361/679.09
See application file for complete search history.

(56) References Cited

U.S. PATENT DOCUMENTS

| | | | | |
|---|---|---|---|---|
| 9,715,254 B2 * | 7/2017 | Mori | ...................... | G06F 1/1632 |
| 11,029,728 B1 * | 6/2021 | Piper | ...................... | G06F 1/1626 |
| 2003/0222149 A1 * | 12/2003 | Solomon | ............... | G06F 1/1669 235/472.01 |
| 2013/0107445 A1 * | 5/2013 | Reber | ................... | G06F 1/1632 361/679.41 |
| 2013/0270980 A1 * | 10/2013 | Hsu | .......................... | H05K 5/03 312/223.1 |
| 2014/0071607 A1 * | 3/2014 | Frinak | ................... | G06F 1/1628 361/679.09 |
| 2014/0355193 A1 * | 12/2014 | Purcocks | .............. | G06F 1/1669 361/679.17 |

* cited by examiner

Primary Examiner — Anthony R Jimenez
(74) Attorney, Agent, or Firm — Grandview Law

(57) ABSTRACT

Systems and methods are involved with an apparatus including a keyboard containment system, which includes an engageable keyboard and an engageable keyboard tray wherein the engageable keyboard tray can be shaped and sized to receive the engageable keyboard and the engageable keyboard tray can be couplable with the engageable keyboard. In addition, other aspects are described.

21 Claims, 9 Drawing Sheets

KEYBOARD CONTAINMENT SYSTEM

SUMMARY

In one or more aspects, an apparatus can include, but is not limited to a keyboard containment system, which can include but is not limited to an engageable keyboard, which can include but not limited to a front side, a right side, a rear side, and a left side; and an engageable keyboard tray, which can include but not limited to a front opening, a right side wall, a rear wall, a left side wall, and a rectangular base, the right side wall, the rear wall, and the left side wall, which can extend substantially perpendicularly from the rectangular base, the engageable keyboard tray can be shaped and sized to receive the engageable keyboard, the right side wall of the engageable keyboard tray can be couplable with the right side of the engageable keyboard, and the left side wall of the engageable keyboard tray can be couplable with the left side of the engageable keyboard. The rear wall of the engageable keyboard tray can be couplable with the rear side of the engageable keyboard. The engageable keyboard tray can include but is not limited to a right side wall interior tab, which can extend from the right side wall of the engageable keyboard tray, and the engageable keyboard can include but is not limited to a right side notch, which can be formed into the right side of the engageable keyboard, wherein the right side wall interior tab of the engageable keyboard tray can be couplable with the right side notch of the engageable keyboard. The engageable keyboard tray can include but is not limited to a right side wall interior notch, which can be formed in the right side wall of the engageable keyboard tray, and the engageable keyboard can include but is not limited to a right side tab, which can extend from the right side of the engageable keyboard. The right side wall interior notch of the engageable keyboard tray can be couplable with the right side tab of the engageable keyboard. The engageable keyboard tray can include but is not limited to a left side wall interior tab, which can extend from the left side wall of the engageable keyboard tray, and the engageable keyboard can include but is not limited to a left side notch, which can be formed into the left side of the engageable keyboard. The left side wall interior tab of the engageable keyboard tray can be couplable with the left side notch of the engageable keyboard. The engageable keyboard tray can include but is not limited to a left side wall interior notch, which can be formed in the left side wall of the engageable keyboard tray, and the engageable keyboard can include but is not limited to a left side tab, which can extend from the left side of the engageable keyboard. The left side wall interior notch of the engageable keyboard tray can be couplable with the left side tab of the engageable keyboard. The right side wall of the engageable keyboard tray can include but is not limited to a right side wall interior elongated edge and a right side wall interior elongated ledge. The right side wall interior elongated ledge can be positioned to extend from the right side wall interior elongated edge over the rectangular base to form an elongated gap between the right side wall interior elongated ledge and the rectangular base to thereby be couplable with one or more portions of the right side of the engageable keyboard. The engageable keyboard tray can include but is not limited to a left side wall interior elongated edge and a left side wall interior elongated ledge. The left side wall interior elongated ledge can be positioned to extend from the left side wall interior elongated edge over the rectangular base to form an elongated gap between the left side wall interior elongated ledge and the rectangular base to thereby be couplable with one or more portions of the left side of the engageable keyboard. The rear wall of the engageable keyboard tray can include but is not limited to a rear wall interior elongated edge and a rear wall interior elongated ledge. The rear wall interior elongated ledge can be positioned to extend from the rear wall interior elongated edge over the rectangular base to form an elongated gap between the rear wall interior elongated ledge and the rectangular base to thereby be couplable with one or more portions of the rear side of the engageable keyboard. The right side of the engageable keyboard can include but is not limited to a right side elongated edge, and a right side elongated ledge, which can be positioned to extend from the right side elongated edge to thereby be couplable with one or more portions of the right side wall of the engageable keyboard tray. The left side of the engageable keyboard can include but is not limited to a left side elongated edge, and a left side elongated ledge, which can be positioned to extend from the left side elongated edge to thereby be couplable with one or more portions of the left side wall of the engageable keyboard tray. The rear side of the engageable keyboard can include but is not limited to a rear elongated edge, and a rear elongated ledge, which can be positioned to extend from the left side elongated edge to thereby be couplable with one or more portions of the left side wall of the engageable keyboard tray. The rear wall of the engageable keyboard tray can include but is not limited to a rear wall interior elongated edge, and a rear wall interior elongated ledge, which can be positioned to extend from the rear wall interior elongated edge. The rear wall interior elongated ledge can include but is not limited to at least one rear wall interior notch, which can be positioned to form a gap between a portion of the rear wall interior elongated edge of the engageable keyboard tray and a portion of the rear side of the engageable keyboard if the engageable keyboard is being coupled with the engageable keyboard tray. The right side wall of the engageable keyboard tray can include but is not limited to a right side wall top notch, and the left side wall of the engageable keyboard tray can include but is not limited to a left side wall top notch. The right side wall top notch and the left side wall top notch can be positioned to receive at least one protrusion of a lower end of a tablet case. The front opening of the engageable keyboard tray can include but is not limited to a front opening extension, which can be couplable with a lower end of a stand for a tablet case. The rear wall of the engageable keyboard tray can include but is not limited to at least one rear wall interior notch to allow for a gap between at least one portion of the rear wall of the engageable keyboard tray and at least one portion of the rear side of the engageable keyboard.

In one or more aspects, an apparatus can include, but is not limited to an engageable keyboard for coupling with an engageable keyboard tray. The engageable keyboard can include but is not limited to a front side, a right side, a rear side, and a left side. The engageable keyboard can be shaped and sized to be received by the engageable keyboard tray. The right side of the engageable keyboard can be couplable with a right side wall of the engageable keyboard tray. The left side of the engageable keyboard can be couplable with a left side wall of the engageable keyboard tray. The engageable keyboard can be couplable with a rear wall of the engageable keyboard tray. The engageable keyboard can include but is not limited to a right side notch, which can be formed into the right side of the engageable keyboard The right side notch of the engageable keyboard can be couplable with a right side wall interior tab of the engageable keyboard tray.

In one or more aspects, an apparatus can include, but is not limited to an engageable keyboard tray for coupling with an engageable keyboard. The engageable keyboard tray can include but is not limited to a front opening, a right side wall, a rear wall, a left side wall, and a rectangular base, the right side wall, the rear wall, and the left side wall can extend substantially perpendicularly from the rectangular base. The engageable keyboard tray can be shaped and sized to receive the engageable keyboard. The right side wall of the engageable keyboard tray can be couplable with a right side of the engageable keyboard. The left side wall of the engageable keyboard tray can be couplable with a left side of the engageable keyboard. The engageable keyboard tray can include but is not limited to a left side wall interior notch, which can be formed in the left side wall of the engageable keyboard tray. The left side wall interior notch of the engageable keyboard tray can be couplable with a left side tab of the engageable keyboard.

In one or more aspects, an apparatus can include, but is not limited to a keyboard containment system for an electronic tablet computing device. The keyboard containment system can include but is not limited to an engageable keyboard, which can include but not limited to a front side, a right side, a rear side, and a left side. The keyboard containment system can include but is not limited to an engageable keyboard tray, which can include but not limited to a front opening, a right side wall, a rear wall, a left side wall, and a rectangular base, the right side wall, the rear wall, and the left side wall can extend substantially perpendicularly from the rectangular base. The engageable keyboard tray can be shaped and sized to receive the engageable keyboard. The right side wall of the engageable keyboard tray can be couplable with the right side of the engageable keyboard, and the left side wall of the engageable keyboard tray can be couplable with the left side of the engageable keyboard. The keyboard containment system can include but is not limited to a tablet case, which includes but not limited to a lower end, a front, and a back. The front of the tablet case can include but is not limited to a front interior surface, a lower interior surface, a left side, an upper side, and a right side. The lower interior surface, the left side, the upper side, and the right side of the tablet case can extend from the front interior surface to form a rectangular container, which can be couplable with the electronic tablet computing device as placed into the rectangular container from the front of the tablet case. The keyboard containment system can include but is not limited to a stand, which can include but not limited to a lower portion with a lower end, an upper portion, with an upper end, and a flexible hinge, which can be coupled between the lower portion and the upper portion. The lower end of the lower portion of the stand can be coupled to the rectangular base of the engageable keyboard tray. The upper end of the upper portion of the stand can be coupled to the back of the tablet case. The front opening of the engageable keyboard tray can include but is not limited to a front opening extension. The front opening extension can extend rearwardly from the rectangular base. The lower end of the lower portion of the stand can be coupled to the rectangular base of the engageable keyboard tray via being coupled to the front opening extension. The right side wall of the engageable keyboard tray can include but is not limited to a right side wall top notch. The left side wall of the engageable keyboard tray can include but is not limited to a left side wall top notch. The lower end of the tablet case can include but is not limited to at least one protrusion. The right side wall top notch and the left side wall top notch can be positioned to receive the at least one protrusion of the lower end of the tablet case. The engageable keyboard can include but is not limited to a communication connector. The lower end of the tablet case can include but is not limited to a lower interior surface, which can include but not limited to an aperture. The lower end of the tablet case can be couplable with the communication connector of the engageable keyboard via the aperture of the lower interior surface of the tablet case. The aperture can be sized, shaped, and positioned to receive the communication connector of the engageable keyboard.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of keyboard containment system based articles of manufacture, compositions of matter, systems for producing and/or methods for producing same that may provide context, for instance, in introducing one or more processes and/or devices described herein.

DETAILED DESCRIPTION

Figure 1:
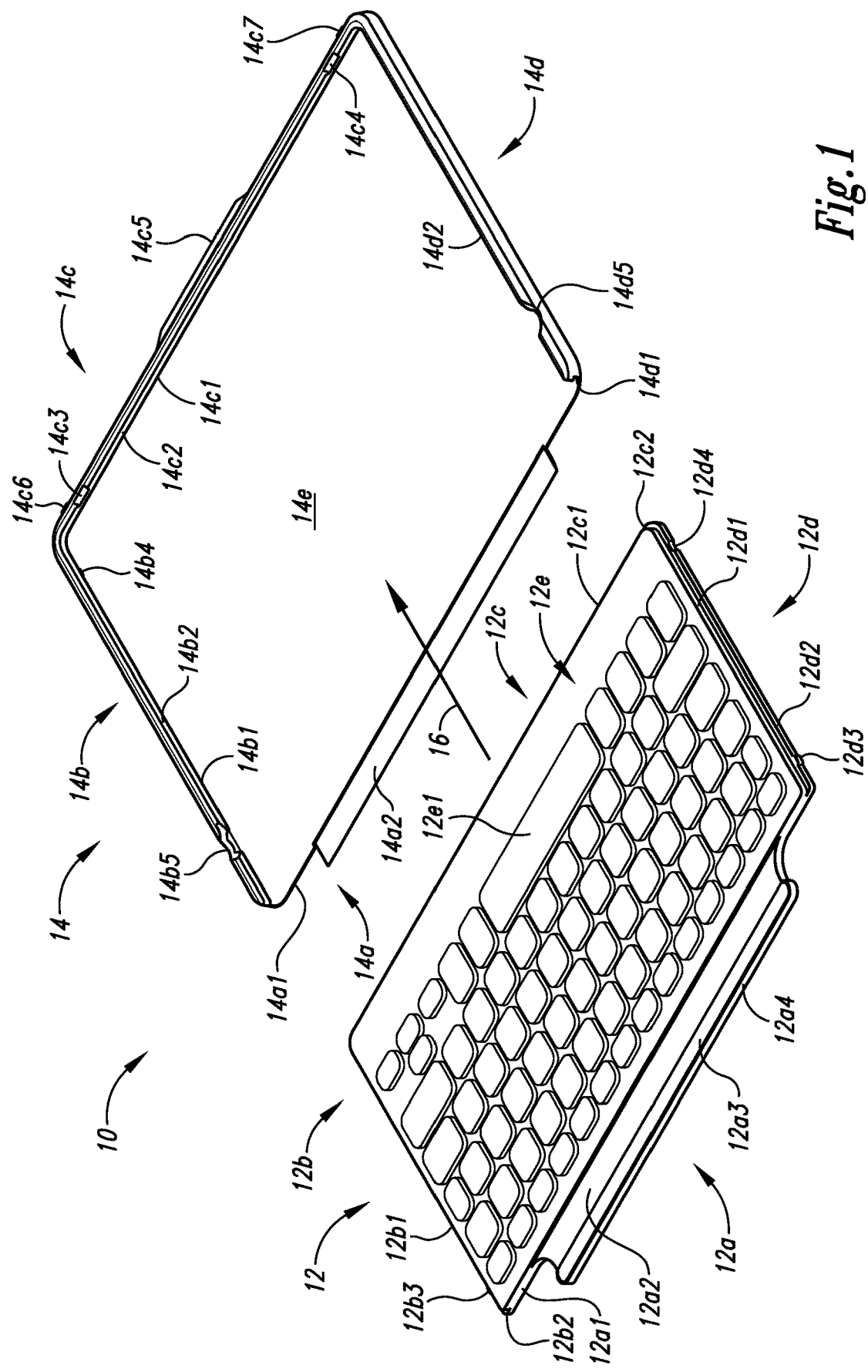
FIG. 1 is a front perspective view of a keyboard containment system.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1 depicted therein is a front perspective view generally related to a keyboard containment system 10 shown to include engageable keyboard 12 and engageable keyboard tray 14 with engageable keyboard 12 shown being inserted into engageable keyboard tray 14 along directional arrow 16.

The engageable keyboard 12 is shown to include front side 12a, right side 12b, rear side 12c, left side 12d, and keyboard keys 12e.

The front side 12a of the engageable keyboard 12 is shown to include front elongated edge 12a1, extended portion 12a2, communication connector 12a3, and extension edge 12a4.

The right side 12b of the engageable keyboard 12 is shown to include right side elongated edge 12b1, right side elongated ledge 12b2, and right side tab 12b3.

The rear side 12c of the engageable keyboard 12 is shown to include rear elongated edge 12c1, and rear elongated ledge 12c2.

The left side 12d of the engageable keyboard 12 is shown to include left side elongated edge 12d1, left side elongated ledge 12d2, left side tab 12d3, and left side notch 12d4.

The keyboard keys 12e of the engageable keyboard 12 are shown to include space bar 12e1.

The engageable keyboard tray 14 is shown to include front opening 14a, right side wall 14b, rear wall 14c, left side wall 14d, and rectangular base 14e.

The front opening 14a of the engageable keyboard tray 14 is shown to include front opening edge 14a1, and front opening extension 14a2.

The right side wall 14b of the engageable keyboard tray 14 is shown to include right side wall interior elongated edge 14b1, right side wall interior elongated ledge 14b2, right side wall interior tab 14b4, and right side wall top notch 14b5.

The rear wall 14c of the engageable keyboard tray 14 is shown to include rear wall interior elongated edge 14c1, rear wall interior elongated ledge 14c2, rear wall interior notch 14c3, rear wall interior notch 14c4, rear wall extension 14c5, rear wall exterior right tab 14c6, and rear wall exterior left tab 14c7.

The left side wall 14d of the engageable keyboard tray 14 is shown to include left side wall interior elongated edge 14d1, left side wall interior elongated ledge 14d2, left side wall interior notch 14d3, left side wall interior tab 14d4, and left side wall top notch 14d5.

Figure 2:
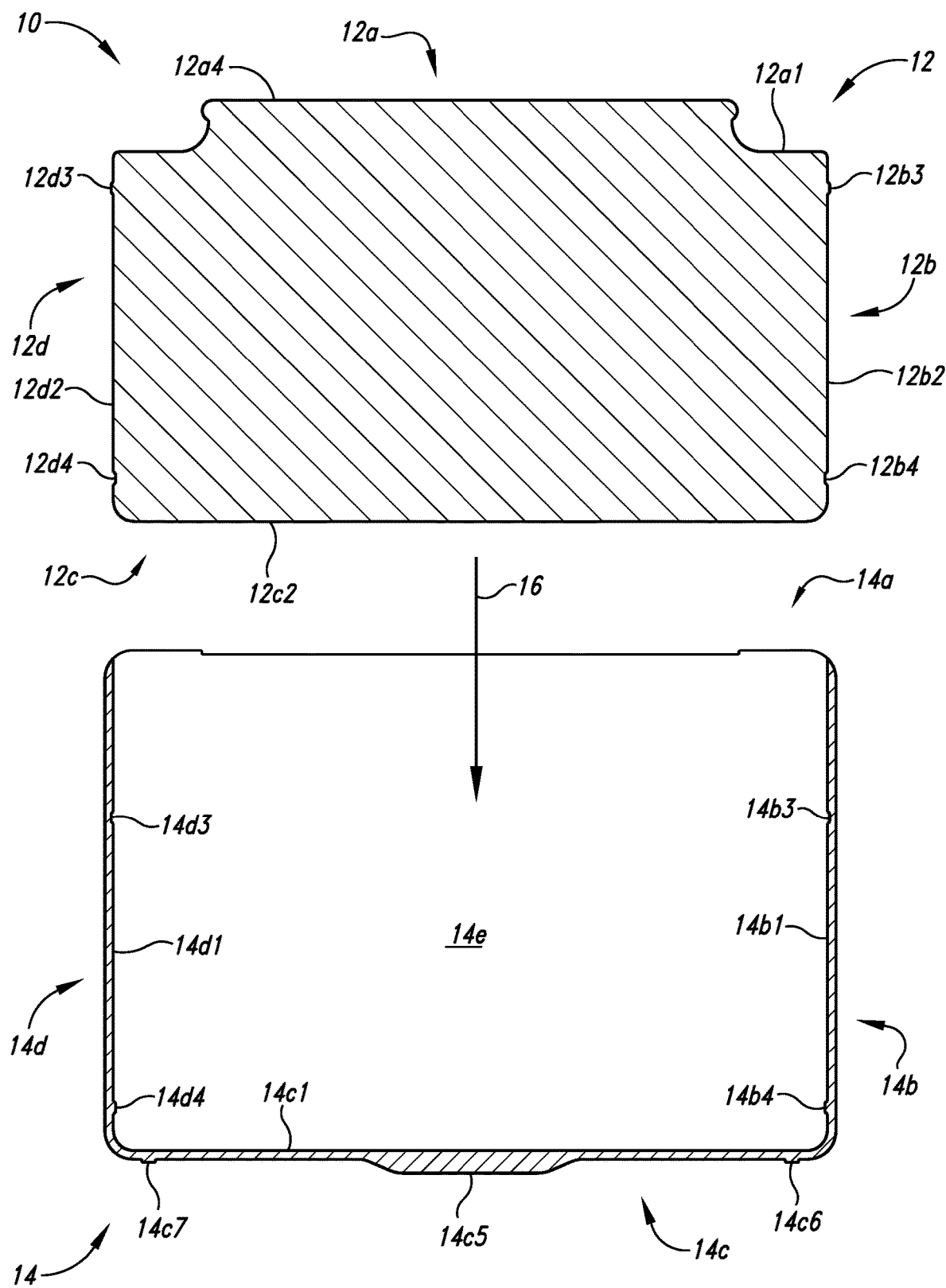
FIG. 2 is a top view of the keyboard containment system of FIG. 1 taken along the 4-4 cut lines of FIG. 3 showing an engageable keyboard being inserted into an engageable keyboard tray of the keyboard containment system.
Figure 3:
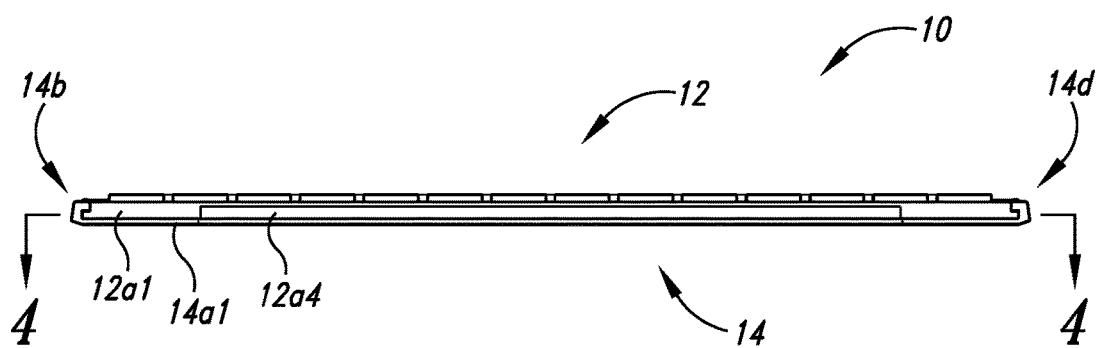
FIG. 3 is a side elevational view of the keyboard containment system of FIG. 1.

Turning to FIG. 2, depicted therein is a top view generally related to the keyboard containment system 10 of FIG. 1 taken along the 4-4 cut lines of FIG. 3 showing the engageable keyboard 12 being inserted into the engageable keyboard tray 14 of the keyboard containment system 10 along directional arrow 16.

The right side 12b of the engageable keyboard 12 is shown to include right side notch 12b4. The right side wall 14b of the engageable keyboard tray 14 is shown to include right side wall interior notch 14b3.

The right side 12b is shown to include in implementations right side notch 12b4. The right side 12b is shown to include in implementations right side notch 12b4

Turning to FIG. 3, depicted therein is a side elevational view of the keyboard containment system 10 of FIG. 1.

Figure 4:
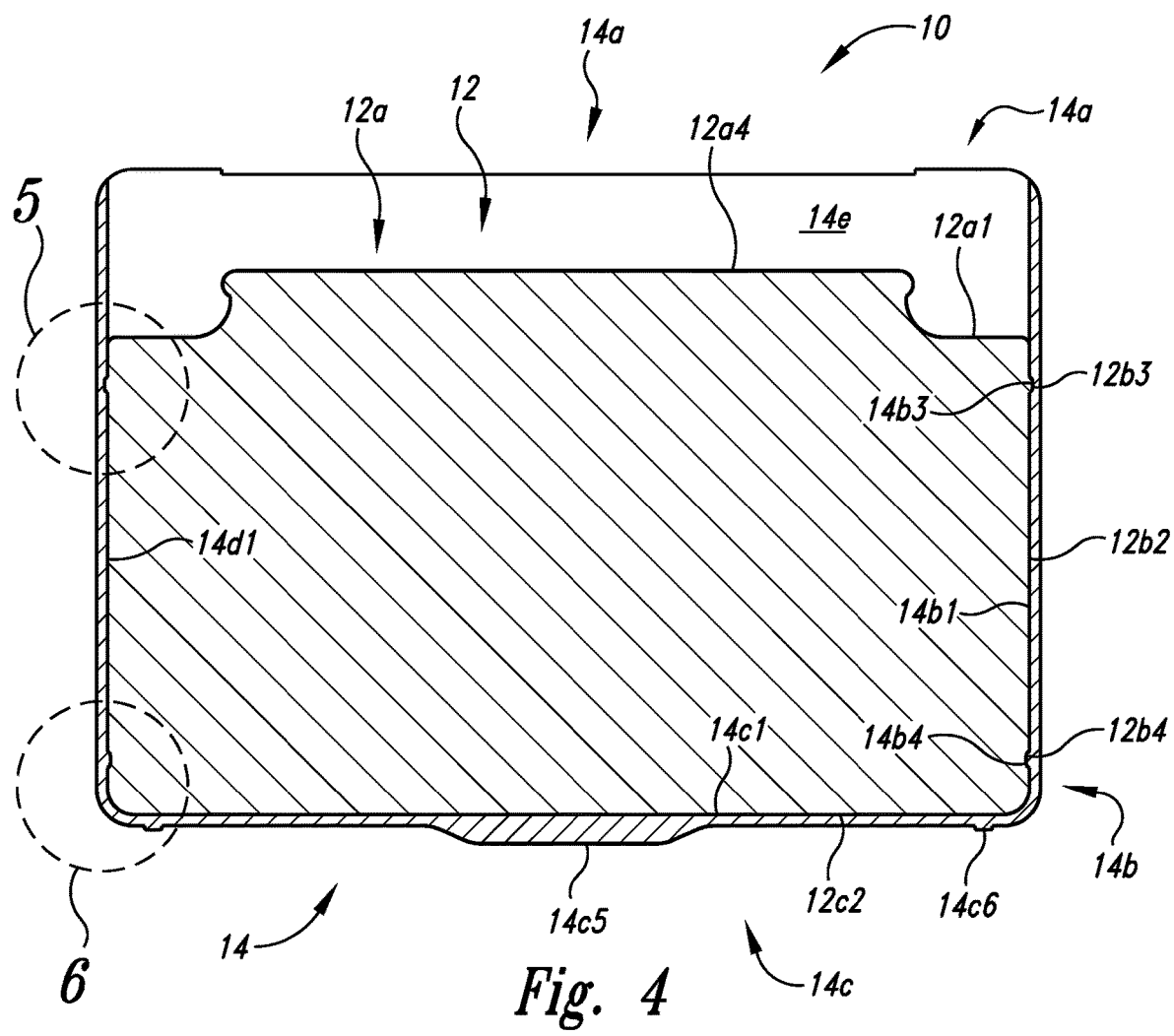
FIG. 4 is a top view of the keyboard containment system of FIG. 1 shown taken along the 4-4 cut lines of FIG. 3 showing the engageable keyboard being coupled with the engageable keyboard tray of the keyboard containment system.

Turning to FIG. 4, depicted therein is a top view of the keyboard containment system 10 of FIG. 1 shown taken along the 4-4 cut lines of FIG. 3 showing the engageable keyboard 12 being coupled with the engageable keyboard tray 14 of the keyboard containment system 10.

Figure 5:
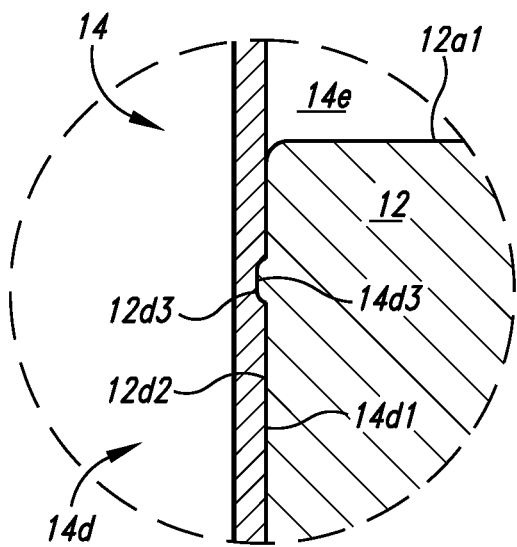
FIG. 5 is an enlarged portion of the top view of the keyboard containment system as indicated by the dashed circle labeled "5" of FIG. 4 showing engagement aspects of the engageable keyboard being coupled with the engageable keyboard tray of the keyboard containment system.

Turning to FIG. 5, depicted therein is an enlarged portion of the top view of the keyboard containment system 10 as indicated by the dashed circle labeled "5" of FIG. 4 showing engagement aspects of the engageable keyboard 12 being coupled with the engageable keyboard tray 14 of the keyboard containment system 10.

Figure 6:
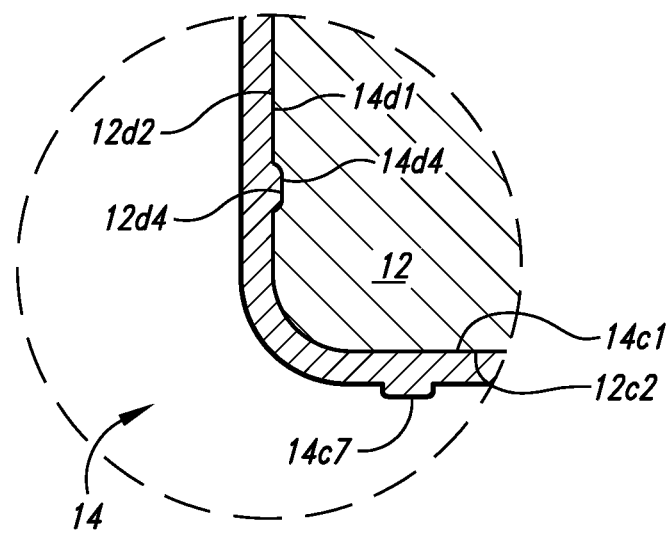
FIG. 6 is an enlarged portion of the top view of the keyboard containment system as indicated by the dashed circle labeled "6" of FIG. 4 showing engagement aspects of the engageable keyboard being coupled with the engageable keyboard tray of the keyboard containment system.

Turning to FIG. 6, depicted therein is an enlarged portion of the top view of the keyboard containment system 10 as indicated by the dashed circle labeled "6" of FIG. 4 showing engagement aspects of the engageable keyboard 12 being coupled with the engageable keyboard tray 14 of the keyboard containment system 10.

Figure 7:
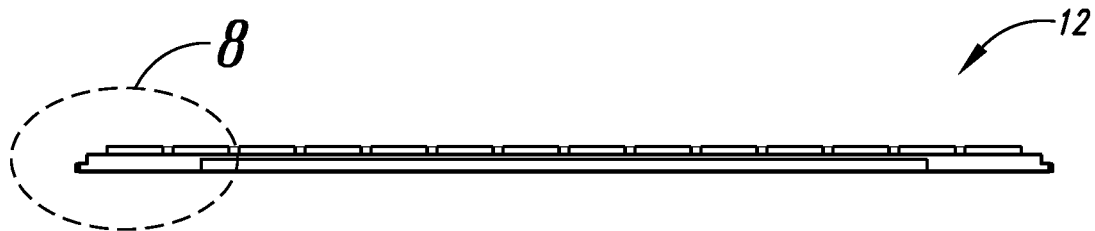
FIG. 7 is a rear-side elevational view of the engageable keyboard of the keyboard containment system of FIG. 1.

Turning to FIG. 7, depicted therein is a rear-side elevational view of the engageable keyboard 12 of the keyboard containment system 10 of FIG. 1.

Figure 8:
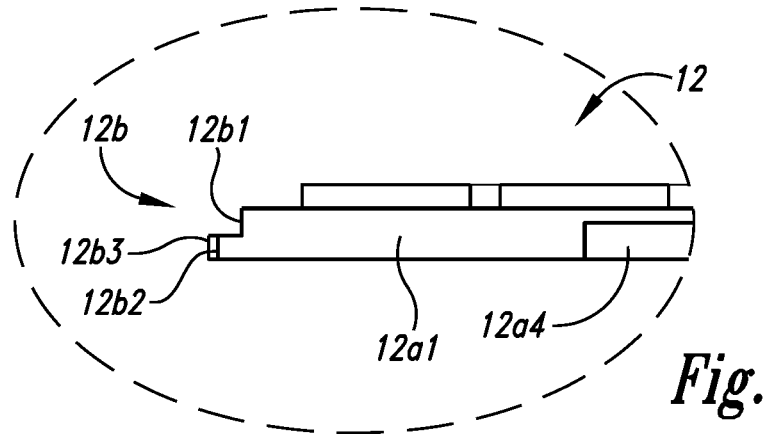
FIG. 8 is an enlarged portion of the rear-side elevational view of the engageable keyboard of the keyboard containment system as indicated by the dashed circle labeled "8" of FIG. 7.

Turning to FIG. 8, depicted therein is an enlarged portion of the rear-side elevational view of the engageable keyboard 12 of the keyboard containment system 10 as indicated by the dashed circle labeled "8" of FIG. 7.

Figure 9:
FIG. 9 is a rear-side elevational view of the engageable keyboard tray of the keyboard containment system of FIG. 1.

Turning to FIG. 9, depicted therein is a rear-side elevational view of the engageable keyboard tray 14 of the keyboard containment system 10 of FIG. 1.

Figure 10:
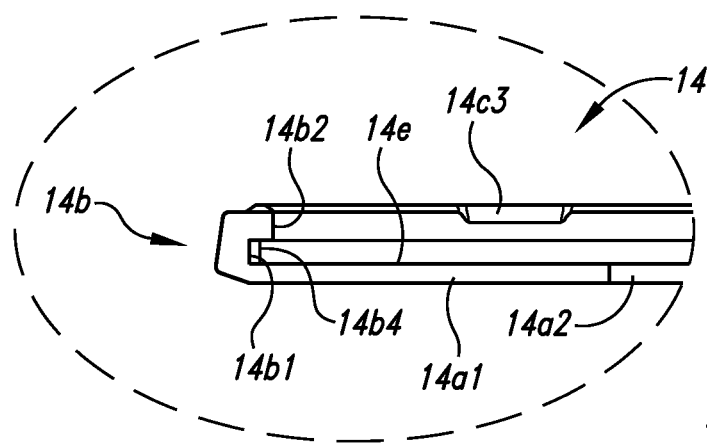
FIG. 10 is an enlarged portion of the rear-side elevational view of the engageable keyboard tray of the keyboard containment system as indicated by the dashed circle labeled "10" of FIG. 9.

Turning to FIG. 10, depicted therein is an enlarged portion of the rear-side elevational view of the engageable keyboard tray 14 of the keyboard containment system 10 as indicated by the dashed circle labeled "10" of FIG. 9.

Figure 11:
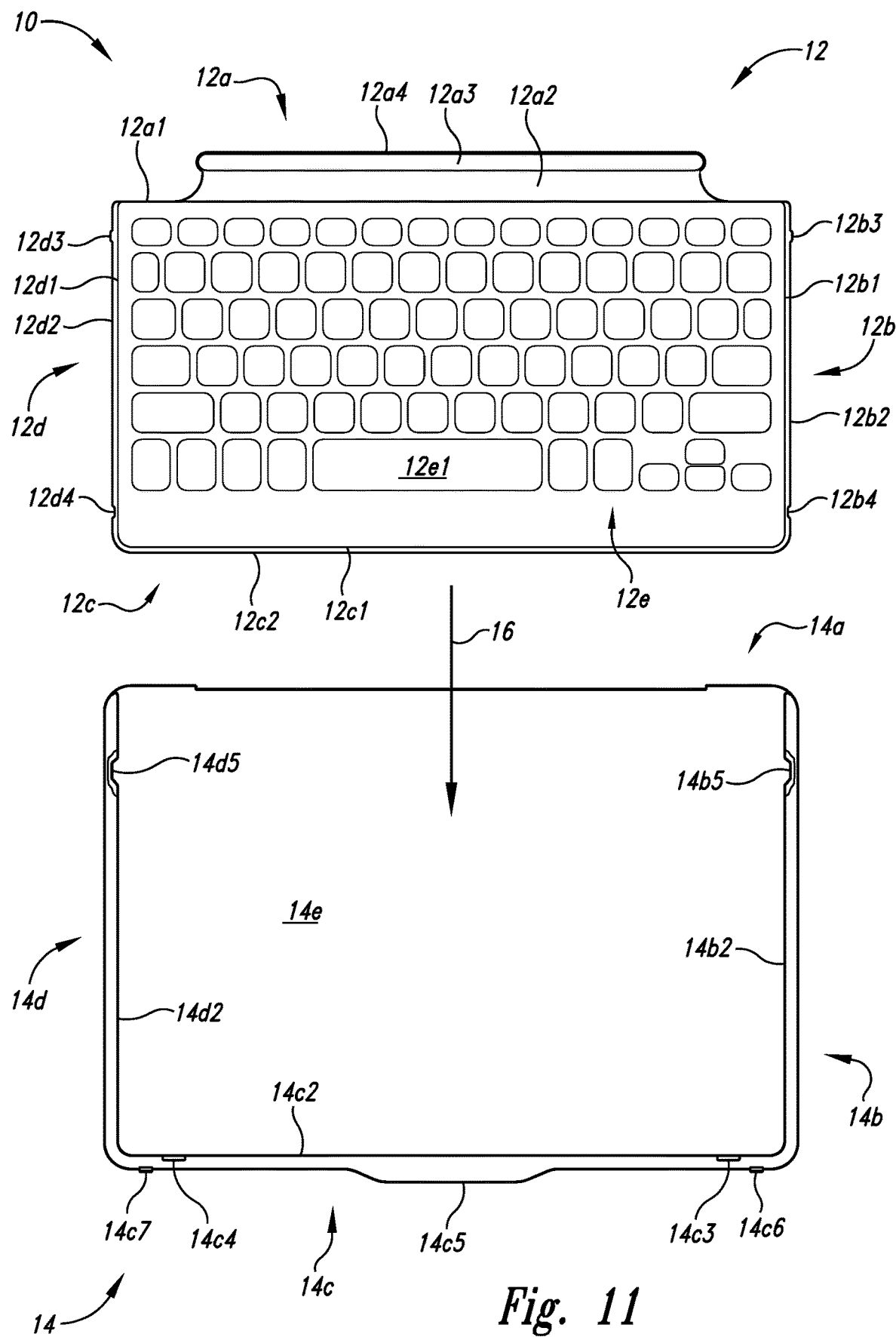
FIG. 11 is a top view of the keyboard containment system of FIG. 1 showing the engageable keyboard being inserted into the engageable keyboard tray of the keyboard containment system.

Turning to FIG. 11, depicted therein is a top view of the keyboard containment system 10 of FIG. 1 showing the engageable keyboard 12 being inserted into the engageable keyboard tray 14 of the keyboard containment system 10.

Figure 12:
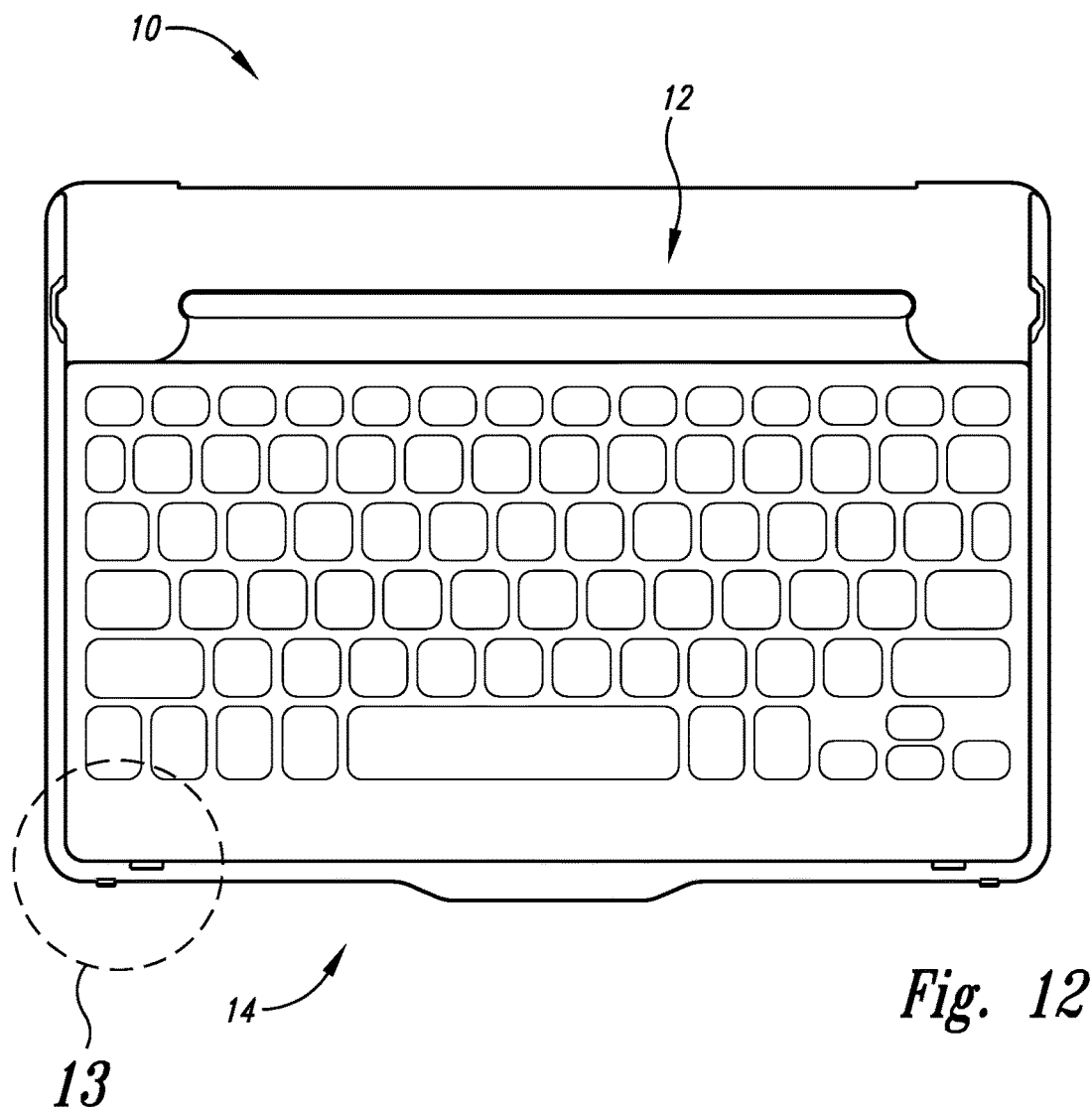
FIG. 12 is a top view of the keyboard containment system of FIG. 1 showing the engageable keyboard being coupled with the engageable keyboard tray of the keyboard containment system.

Turning to FIG. 12, depicted therein is a top view of the keyboard containment system 10 of FIG. 1 showing the engageable keyboard 12 being coupled with the engageable keyboard tray 14 of the keyboard containment system 10.

Figure 13:
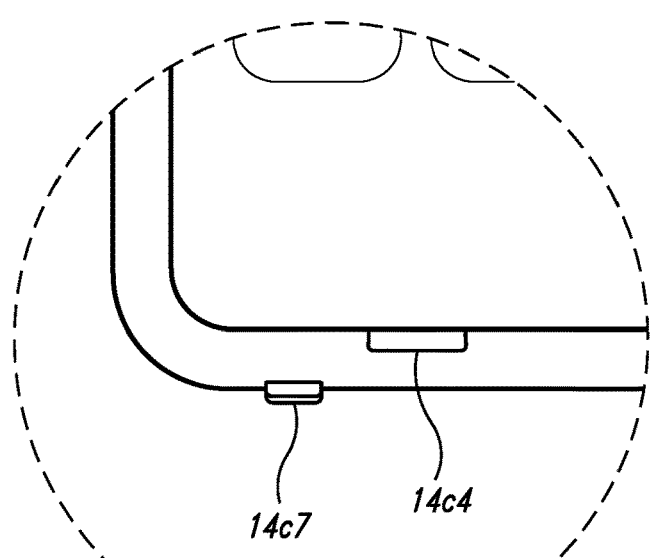
FIG. 13 is an enlarged portion of the top view of the keyboard containment system as indicated by the dashed circle labeled "13" of FIG. 12 showing disengagement aspects of the engageable keyboard being coupled with the engageable keyboard tray of the keyboard containment system.

Turning to FIG. 13, depicted therein is an enlarged portion of the top view of the keyboard containment system 10 as indicated by the dashed circle labeled "13" of FIG. 12 showing disengagement aspects of the engageable keyboard 12 being coupled with the engageable keyboard tray 14 of the keyboard containment system 10.

Figure 14:
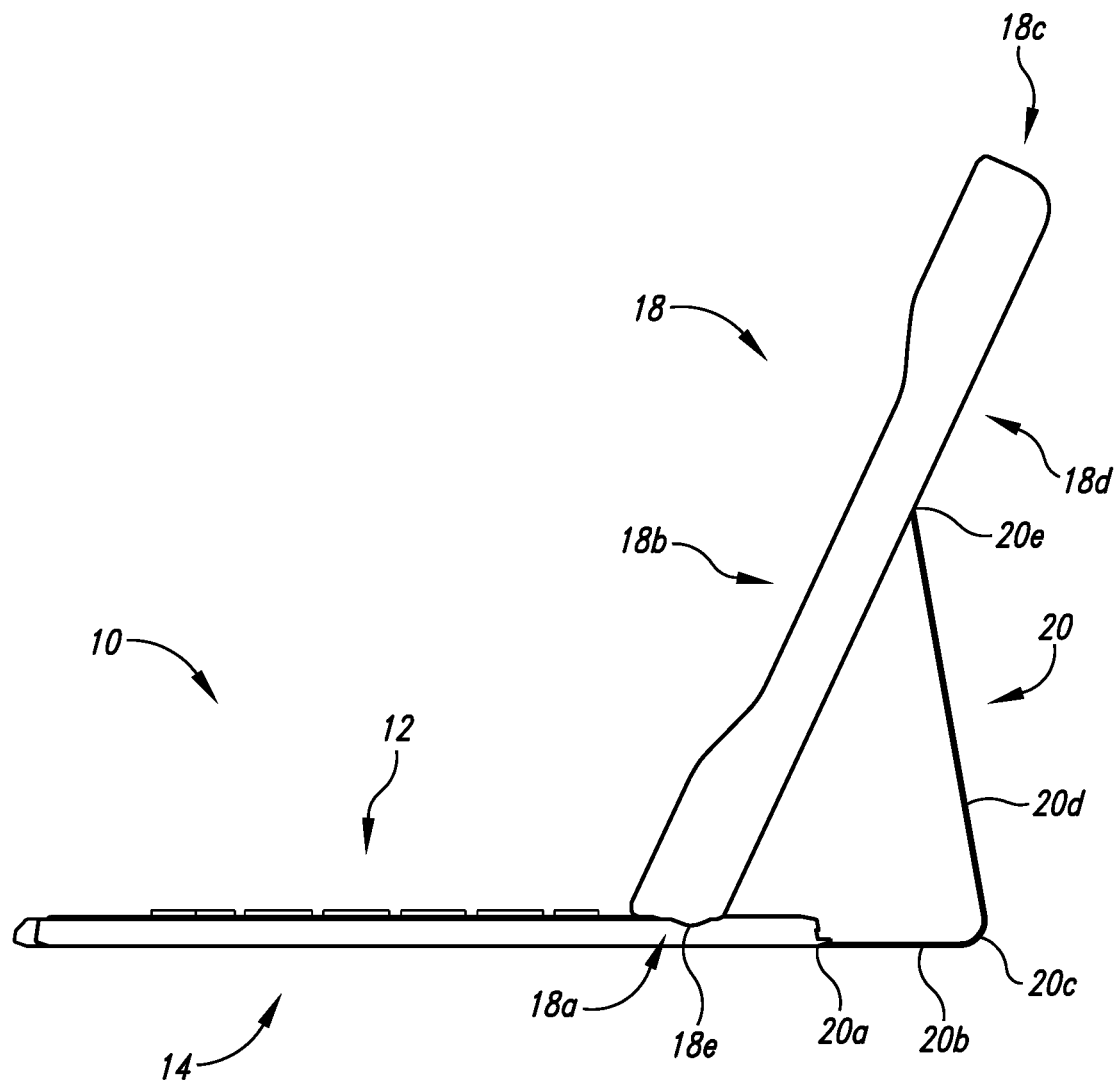
FIG. 14 is a side-elevational view of a tablet case being coupled with the keyboard containment system of FIG. 1 and a stand being coupled with the keyboard containment system and the tablet case.

Turning to FIG. 14, depicted therein is a side-elevational view of a tablet case 18 being coupled with the keyboard containment system 10 of FIG. 1 and a stand 20 being coupled with the keyboard containment system 10 and the tablet case 18.

The tablet case 18 is shown to include lower end 18a, front 18b, upper end 18c, back 18d, and protrusion 18e. The stand 20 is shown to include lower end 20a, lower portion 20b, flexible hinge 20c, upper portion 20d, and upper end 20e.

Figure 15:
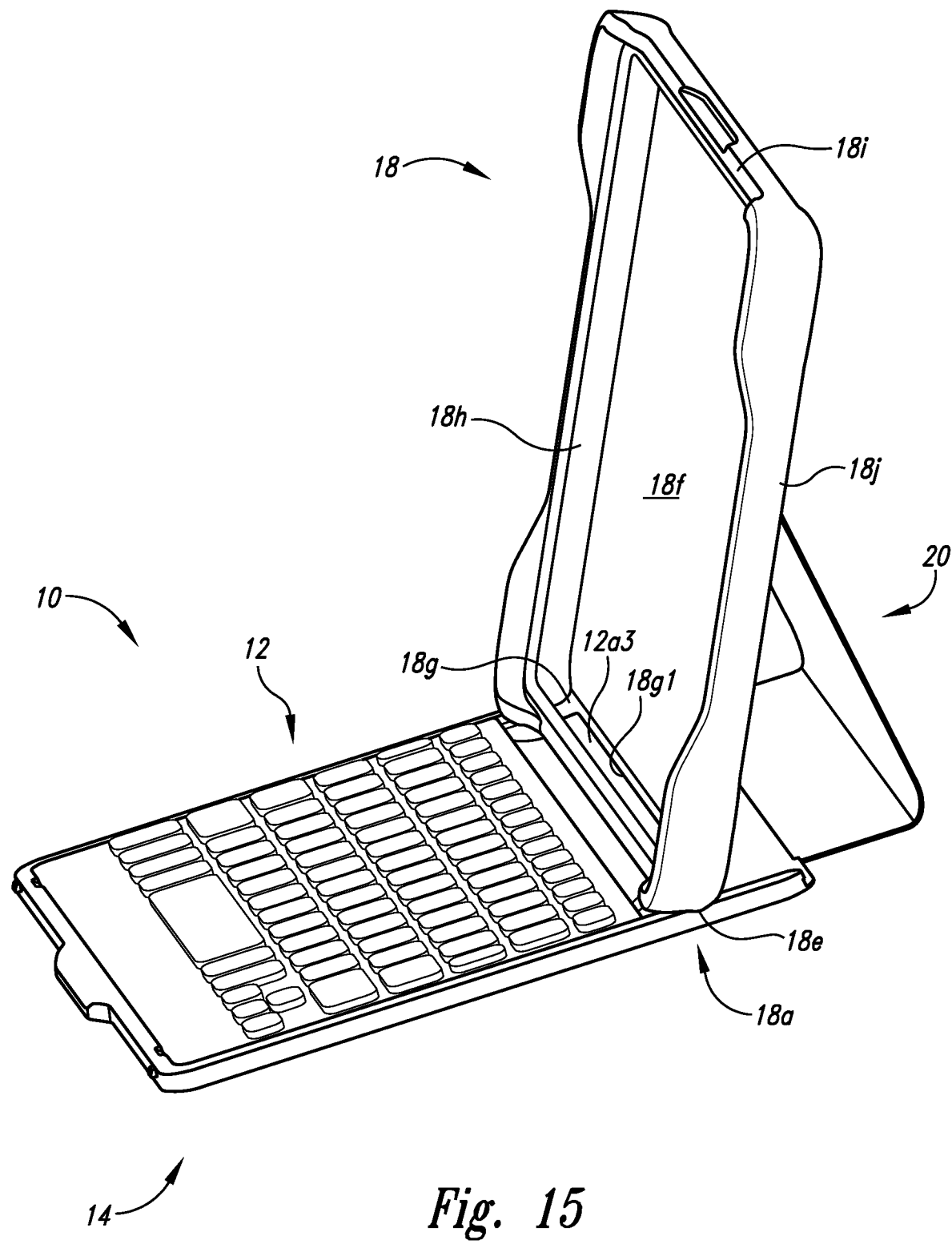
FIG. 15 is a front perspective view of a 9 is a tablet case being coupled with the keyboard containment system of FIG. 1 and a stand being coupled with the keyboard containment system and the tablet case.

Turning to FIG. 15, depicted therein is a front perspective view of the tablet case 18 being coupled with the keyboard containment system 10 of FIG. 1 and the stand 20 being coupled with the keyboard containment system 10 and the tablet case 18. The tablet case 18 is shown to include front interior surface 18f, lower interior surface 18g, left side 18h, upper side 18i, and right side 18j. The lower interior surface 18g of tablet case 18 is shown to include aperture 18g1.

As shown by one or more of FIGS. 1-15, implementations of keyboard containment system 10 can include an engageable keyboard 12, which can include front side 12a, right side 12b, rear side 12c, and left side 12d; and engageable keyboard tray 14, which can include front opening 14a, right side wall 14b, rear wall 14c, left side wall 14d, and rectangular base 14e.

In implementations, the right side wall 14b, rear wall 14c, and left side wall 14d can extend substantially perpendicularly from the rectangular base 14e, wherein (a) the engageable keyboard tray 14 can be shaped and sized to receive the engageable keyboard 12, (b) the right side wall 14b of the engageable keyboard tray 14 can be couplable with the right side 12b of the engageable keyboard 12, and (c) the left side wall 14d of the engageable keyboard tray 14 being couplable with the left side 12d of the engageable keyboard 12.

In implementations, the rear wall 14c of the engageable keyboard tray 14 can be couplable with the rear side 12c of the engageable keyboard 12.

In implementations, the right side wall interior tab 14b4 can extend from the right side wall 14b of the engageable keyboard tray 14, and the right side notch 12b4 can be formed into the right side 12b of the engageable keyboard 12, wherein the right side wall interior tab 14b4 of the engageable keyboard tray 14 can be couplable with the right side notch 12b4 of the engageable keyboard 12.

In implementations, the right side wall interior notch 14b3 can be formed in right side wall 14b of the engageable keyboard tray 14, and the right side tab 12b3 can extend from the right side 12b of the engageable keyboard 12, wherein the right side wall interior notch 14b3 of the engageable keyboard tray 14 can be couplable with the right side tab 12b3 of the engageable keyboard 12.

In implementations, the left side wall interior tab 14d4 can extend from the left side wall 14d of the engageable keyboard tray 14, and the left side notch 12d4 can be formed into the left side 12d of the engageable keyboard 12, wherein the left side wall interior tab 14d4 of the engageable keyboard tray 14 can be couplable with the left side notch 12d4 of the engageable keyboard 12.

In implementations, the left side wall interior notch 14d3 can be formed in the left side wall 14d of the engageable keyboard tray 14, and the left side tab 12d3 can extend from the left side 12d of the engageable keyboard 12, wherein the left side wall interior notch 14d3 of the engageable keyboard tray 14 can be couplable with the left side tab 12d3 of the engageable keyboard 12.

In implementations, the right side wall 14b of the engageable keyboard tray 14 can include right side wall interior elongated edge 14b1 and right side wall interior elongated ledge 14b2, wherein the right side wall interior elongated ledge 14b2 can be positioned to extend from the right side wall interior elongated edge 14b1 over the rectangular base 14e to form an elongated gap between the right side wall interior elongated ledge 14b2 and the rectangular base 14e to thereby be couplable with one or more portions of the right side 12b of the engageable keyboard 12.

In implementations, the engageable keyboard tray 14 can include left side wall interior elongated edge 14d1 and left side wall interior elongated ledge 14d2, wherein the left side wall interior elongated ledge 14d2 can be positioned to extend from the left side wall interior elongated edge 14d1 over the rectangular base 14e to form an elongated gap between the left side wall interior elongated ledge 14d2 and the rectangular base 14e to thereby be couplable with one or more portions of the left side 12d of the engageable keyboard 12.

In implementations, the rear wall 14c of the engageable keyboard tray 14 can include rear wall interior elongated edge 14c1 and rear wall interior elongated ledge 14c2, wherein the rear wall interior elongated ledge 14c2 can be positioned to extend from the rear wall interior elongated edge 14c1 over the rectangular base 14e to form an elongated gap between the rear wall interior elongated ledge 14c2 and the rectangular base 14e to thereby be couplable with one or more portions of the rear side 12c of the engageable keyboard 12.

In implementations, the right side 12b of the engageable keyboard 12 can include right side elongated edge 12b1, and right side elongated ledge 12b2, which can be positioned to extend from the right side elongated edge 12b1 to thereby be couplable with one or more portions of the right side wall 14b of the engageable keyboard tray 14.

In implementations, the engageable keyboard 12 can include left side elongated edge 12d1, and left side elongated ledge 12d2, which can be positioned to extend from the left side elongated edge 12d1 to thereby be couplable with one or more portions of the left side wall 14d of the engageable keyboard tray 14.

In implementations, the rear side 12c of the engageable keyboard 12 can include rear elongated edge 12c1, and rear elongated ledge 12c2, which can be positioned to extend from the left side elongated edge 12d1 to thereby be couplable with one or more portions of the left side wall 14d of the engageable keyboard tray 14.

In implementations, the rear wall 14c of the engageable keyboard tray 14 can include rear wall interior elongated edge 14c1, and rear wall interior elongated ledge 14c2, which can be positioned to extend from the rear wall interior elongated edge 14c1.

In implementations, the rear wall interior elongated ledge 14c2 can include rear wall interior notch 14c3, which can be positioned to form a gap between a portion of the rear wall interior elongated edge 14c1 of the engageable keyboard tray 14 and a portion of the rear side 12c of the engageable keyboard 12 if the engageable keyboard 12 is being coupled with the engageable keyboard tray 14.

In implementations, the right side wall 14b of the engageable keyboard tray 14 can include right side wall top notch 14b5, and the left side wall 14d of the engageable keyboard tray 14 can include left side wall top notch 14d5. The right side wall top notch 14b5 and the left side wall top notch 14d5 can be positioned to receive the protrusion 18e of lower end 18a of tablet case 18.

In implementations, the front opening 14a of the engageable keyboard tray 14 can include front opening extension 14a2, which can be couplable with the lower end 20a of the stand 20 for the tablet case 18.

In implementations, the rear wall 14c of the engageable keyboard tray 14 can include the rear wall interior notch 14c3 to allow for a gap between a portion of the rear wall 14c of the engageable keyboard tray 14 and a portion of the rear side 12c of the engageable keyboard 12. The rear wall 14c of the engageable keyboard tray 14 can include the rear wall interior notch 14c4 to allow for a gap between a portion of the rear wall 14c of the engageable keyboard tray 14 and a portion of the rear side 12c of the engageable keyboard 12.

In implementations, the engageable keyboard 12 can include front side 12a, right side 12b, rear side 12c, and left side 12d, wherein the engageable keyboard 12 can be shaped and sized to be received by the engageable keyboard tray 14. The right side 12b of the engageable keyboard 12 can be couplable with the right side wall 14b of the engageable keyboard tray 14, and the left side 12d of the engageable keyboard 12 can be couplable with the left side wall 14d of the engageable keyboard tray 14.

In implementations, the rear side 12c of the engageable keyboard 12 can be couplable with the rear wall 14c of the engageable keyboard tray 14.

In implementations, the engageable keyboard 12 can include right side notch 12b4 formed into the right side 12b of the engageable keyboard 12, wherein the right side notch 12b4 of the engageable keyboard 12 can be couplable with a right side wall interior tab 14b4 of the engageable keyboard tray 14.

In implementations, the engageable keyboard tray 14 can include front opening 14a, right side wall 14b, rear wall 14c, left side wall 14d, and rectangular base 14e, wherein the right side wall 14b, the rear wall 14c, and the left side wall 14d can extend substantially perpendicularly from the rectangular base 14e, wherein engageable keyboard tray 14 can be shaped and sized to receive the engageable keyboard 12, wherein the right side wall 14b of the engageable keyboard tray 14 can be couplable with a right side 12b of the engageable keyboard 12, and wherein the left side wall 14d of the engageable keyboard tray 14 can be couplable with a left side 12d of the engageable keyboard 12.

In implementations, the engageable keyboard tray 14 can include left side wall interior notch 14d3 formed in the left side wall 14d of the engageable keyboard tray 14, wherein the left side wall interior notch 14d3 of the engageable keyboard tray 14 can be couplable with a left side tab 12d3 of the engageable keyboard 12.

In implementations, the keyboard containment system 10 can include the engageable keyboard 12, which can include front side 12a, right side 12b, rear side 12c, and left side 12d. The keyboard containment system 10 can include the engageable keyboard tray 14, which can include front opening 14a, right side wall 14b, rear wall 14c, left side wall 14d, and rectangular base 14e, wherein the right side wall 14b, the rear wall 14c, and the left side wall 14d can extend substantially perpendicularly from the rectangular base 14e, wherein the engageable keyboard tray 14 can be shaped and sized to receive the engageable keyboard 12, wherein the right side wall 14b of the engageable keyboard tray 14 can be couplable with the right side 12b of the engageable keyboard 12, and wherein the left side wall 14d of the engageable keyboard tray 14 can be couplable with the left side 12d of the engageable keyboard 12.

In implementations, the keyboard containment system 10 can include the tablet case 18, which can include lower end 18a, front 18b, and back 18d, wherein the front 18b of the tablet case 18 can include front interior surface 18f, lower interior surface 18g, left side 18h, upper side 18i, and right side 18j, wherein the lower interior surface 18g, the left side 18h, the upper side 18i, and the right side 18j of the tablet case 18 can extend from the front interior surface 18f to form a rectangular container couplable with a conventional electronic tablet computing device (not shown) as placed into the rectangular container from the front 18b of the tablet case 18.

In implementations, the keyboard containment system 10 can include stand 20, which can include lower portion 20b with lower end 20a, upper portion 20d, with upper end 20e, and the flexible hinge 20c can be coupled between the lower portion 20b and the upper portion 20d, wherein the lower end 20a of the lower portion 20b of the stand 20 can be coupled to the rectangular base 14e of the engageable keyboard tray 14, and wherein the upper end 20e of the upper portion 20d of the stand 20 can be coupled to the back 18d of the tablet case 18.

In implementations, the front opening 14a of the engageable keyboard tray 14 can include front opening extension 14a2, which can extend rearwardly from the rectangular base 14e, wherein the lower end 20a of the lower portion 20b of the stand 20 can be coupled to the rectangular base 14e of the engageable keyboard tray 14 via being coupled to the front opening extension 14a2.

In implementations, the right side wall 14b of the engageable keyboard tray 14 can include right side wall top notch 14b5, the left side wall 14d of the engageable keyboard tray 14 can include left side wall top notch 14d5, and the lower end 18a of the tablet case 18 can include protrusion 18e, wherein the right side wall top notch 14b5 and the left side wall top notch 14d5 can be positioned to receive the protrusion 18e of the lower end 18a of the tablet case 18.

In implementations, the engageable keyboard 12 can include communication connector 12a3, and the lower end 18a of the tablet case 18 can include lower interior surface 18g, which can include aperture 18g1, wherein the lower end 18a of the tablet case 18 can be couplable with the communication connector 12a3 of the engageable keyboard 12 via the aperture 18g1 of the lower interior surface 18g of the tablet case 18. The aperture 18g1 can be sized, shaped, and positioned to receive the communication connector 12a3 of the engageable keyboard 12.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A keyboard containment system comprising:
(I) an engageable keyboard including a front side, a right side, a rear side, and a left side; and
(II) an engageable keyboard tray including a front opening, a right side wall, a rear wall, a left side wall, and a rectangular base, the rectangular base including a right side, a rear side, a left side opposite the right side, and a front side opposite the rear side, the right side wall, the rear wall, and the left side wall extending substantially perpendicularly from the right side, the rear side, and the left side of the rectangular base, respectively, the rectangular base without a wall extending from the front side of the rectangular base thereby forming the front opening to extend from the front side of the rectangular base with the front opening facing in a direction opposite and away from the rear wall,
(A) the engageable keyboard tray being shaped and sized to receive the engageable keyboard by a slidable insertion of the engageable keyboard through the front opening of the engageable keyboard tray in a first direction parallel to the rectangular base of the engageable keyboard tray, the first direction being parallel with the right side wall and the left side wall of the engageable keyboard tray,
(B) the right side wall of the engageable keyboard tray including at least one of (1) at least one notch extending perpendicularly inwardly into the right side wall of the engageable keyboard tray and (2) at least one tab extending perpendicularly outward from the right side wall of the engageable keyboard tray, the right side of the engageable keyboard including at least one of (1) at least one notch extending perpendicularly inwardly into the right side of the engageable keyboard and (2) at least one tab extending perpendicularly outward from the right side of the engageable keyboard,
(C) the right side wall of the engageable keyboard tray being couplable with the right side of the engageable keyboard,
(i) wherein when the right side wall of the engageable keyboard tray includes the at least one notch extending perpendicularly inwardly into the right side wall of the engageable keyboard tray, the right side of the engageable keyboard includes the at least one tab extending perpendicularly outward from the right side of the engageable keyboard, and
(ii) wherein when the right side wall of the engageable keyboard tray includes the at least one tab extending perpendicularly from the right side wall of the engageable keyboard tray, the right side of the engageable keyboard includes the at least one notch extending perpendicularly inwardly into the right side of the engageable keyboard,
(iii) wherein when the engageable keyboard tray is fully coupled with the engageable keyboard, wherein when the right side wall of the engageable keyboard tray includes the at least one notch extending perpendicularly inwardly into the right side wall of the engageable keyboard tray, and wherein when the right side of the engageable keyboard includes the at least one tab extending perpendicularly outward from the right side of the engageable keyboard,
   (a) the at least one notch of the right side wall of the engageable keyboard tray is engaged with the at least one tab of the right side of the engageable keyboard,
   (b) the at least one notch of the right side wall of the engageable keyboard tray is extending inwardly into the right side wall of the engageable keyboard tray in a direction perpendicular to the first direction in which the engageable keyboard has been slidably inserted through the front opening of the engageable keyboard tray, and
   (c) the at least one tab of the right side of the engageable keyboard is extending outwardly from the right side of the engageable keyboard in a direction perpendicular to the first direction in which the engageable keyboard has been slidably inserted through the front opening of the engageable keyboard tray,
 (iv) wherein when the engageable keyboard tray is fully coupled with the engageable keyboard, wherein when the right side wall of the engageable keyboard tray includes the at least one tab extending perpendicularly outward from the right side wall of the engageable keyboard tray, and wherein when the right side of the engageable keyboard includes the at least one notch extending perpendicularly inward into the right side of the engageable keyboard,
   (a) the at least one tab of the right side wall of the engageable keyboard tray is engaged with the at least one notch of the right side of the engageable keyboard,
   (b) the at least one tab of the right side wall of the engageable keyboard tray is extending outwardly from the right side wall of the engageable keyboard tray in a direction perpendicular to the first direction in which the engageable keyboard has been slidably inserted through the front opening of the engageable keyboard tray, and
   (c) the at least one notch of the right side of the engageable keyboard is extending inwardly into the right side of the engageable keyboard in a direction perpendicular to the first direction in which the engageable keyboard has been slidably inserted through the front opening of the engageable keyboard tray,
(D) the left side wall of the engageable keyboard tray including at least one of (1) at least one notch extending perpendicularly inwardly into the left side wall of the engageable keyboard tray and (2) at least one tab extending perpendicularly outward from the left side wall of the engageable keyboard tray, the left side of the engageable keyboard including at least one of (1) at least one notch extending perpendicularly inwardly into the left side of the engageable keyboard and (2) at least one tab extending perpendicularly outward from the left side of the engageable keyboard, and
(E) the left side wall of the engageable keyboard tray being couplable with the left side of the engageable keyboard,
 (i) wherein when the left side wall of the engageable keyboard tray includes the at least one notch extending perpendicularly inwardly into the left side wall of the engageable keyboard tray, the left side of the engageable keyboard includes the at least one tab extending perpendicularly outward from the left side of the engageable keyboard, and
 (ii) wherein when the left side wall of the engageable keyboard tray includes the at least one tab extending perpendicularly from the left side wall of the engageable keyboard tray, the left side of the engageable keyboard includes the at least one notch extending perpendicularly inwardly into the left side of the engageable keyboard,
 (iii) wherein when the engageable keyboard tray is fully coupled with the engageable keyboard, wherein when the left side wall of the engageable keyboard tray includes the at least one notch extending perpendicularly inwardly into the left side wall of the engageable keyboard tray, and wherein when the left side of the engageable keyboard includes the at least one tab extending perpendicularly outward from the left side of the engageable keyboard,
   (a) the at least one notch of the left side wall of the engageable keyboard tray is engaged with the at least one tab of the left side of the engageable keyboard,
   (b) the at least one notch of the left side wall of the engageable keyboard tray is extending inwardly into the left side wall of the engageable keyboard tray in a direction perpendicular to the first direction in which the engageable keyboard has been slidably inserted through the front opening of the engageable keyboard tray, and
   (c) the at least one tab of the left side of the engageable keyboard is extending outwardly from the left side of the engageable keyboard in a direction perpendicular to the first direction in which the engageable keyboard has been slidably inserted through the front opening of the engageable keyboard tray,
 (iv) wherein when the engageable keyboard tray is fully coupled with the engageable keyboard, wherein when the left side wall of the engageable keyboard tray includes the at least one tab extending perpendicularly outward from the left side wall of the engageable keyboard tray, and wherein when the left side of the engageable keyboard includes the at least one notch extending perpendicularly inward into the left side of the engageable keyboard,
   (a) the at least one tab of the left side wall of the engageable keyboard tray is engaged with the at least one notch of the left side of the engageable keyboard,
   (b) the at least one tab of the left side wall of the engageable keyboard tray is extending outwardly from the left side wall of the engageable keyboard tray in a direction perpendicular to the first direction in which the engageable keyboard has been slidably inserted through the front opening of the engageable keyboard tray, and
   (c) the at least one notch of the left side of the engageable keyboard is extending inwardly into the left side of the engageable keyboard in a direction perpendicular to the first direction in which the engageable keyboard has been slidably inserted through the front opening of the engageable keyboard tray.

2. The keyboard containment system of claim 1 wherein the rear wall of the engageable keyboard tray being couplable with the rear side of the engageable keyboard, wherein the rear wall of the engageable keyboard tray includes at least one rear wall interior notch to allow for a gap between at least one portion of the rear wall of the engageable keyboard tray and at least one portion of the rear side of the engageable keyboard when the rear wall of the engageable keyboard tray is coupled with the rear side of the engageable keyboard, and wherein the at least one rear wall interior notch extends along the rear wall of the engageable keyboard tray no more than one-twentieth of the rear wall of the engageable keyboard tray.

3. The keyboard containment system of claim 1 wherein the rear wall of the engageable keyboard tray being couplable with the rear side of the engageable keyboard, wherein the rear wall of the engageable keyboard tray includes at least one rear wall interior notch to allow for a gap between at least one portion of the rear wall of the engageable keyboard tray and at least one portion of the rear side of the engageable keyboard when the rear wall of the engageable keyboard tray is coupled with the rear side of the engageable keyboard, and wherein the at least one rear wall interior notch extends along the rear wall of the engageable keyboard tray no more than one-thirtieth of the rear wall of the engageable keyboard tray.

4. The keyboard containment system of claim 1 wherein the rear wall of the engageable keyboard tray being couplable with the rear side of the engageable keyboard, wherein the rear wall of the engageable keyboard tray includes at least one rear wall interior notch to allow for a gap between at least one portion of the rear wall of the engageable keyboard tray and at least one portion of the rear side of the engageable keyboard when the rear wall of the engageable keyboard tray is coupled with the rear side of the engageable keyboard, and wherein the at least one rear wall interior notch extends along the rear wall of the engageable keyboard tray no more than one-tenth of the rear wall of the engageable keyboard tray.

5. The keyboard containment system of claim 4 wherein the right side wall of the engageable keyboard tray including
(I) a right side wall interior elongated edge and
(II) a right side wall interior elongated ledge,
  (a) the right side wall interior elongated ledge being positioned to extend from the right side wall interior elongated edge over the rectangular base to form an elongated gap between the right side wall interior elongated ledge and the rectangular base to thereby be couplable with one or more portions of the right side of the engageable keyboard.

6. The keyboard containment system of claim 4 wherein the left side wall of the engageable keyboard tray including
(I) a left side wall interior elongated edge and
(II) a left side wall interior elongated ledge,
  (a) the left side wall interior elongated ledge being positioned to extend from the left side wall interior elongated edge over the rectangular base to form an elongated gap between the left side wall interior elongated ledge and the rectangular base to thereby be couplable with one or more portions of the left side of the engageable keyboard.

7. The keyboard containment system of claim 4 wherein the rear wall of the engageable keyboard tray including
(I) a rear wall interior elongated edge and
(II) a rear wall interior elongated ledge,
  (a) the rear wall interior elongated ledge being positioned to extend from the rear wall interior elongated edge over the rectangular base to form an elongated gap between the rear wall interior elongated ledge and the rectangular base to thereby be couplable with one or more portions of the rear side of the engageable keyboard.

8. The keyboard containment system of claim 4 wherein the right side of the engageable keyboard including
(I) a right side elongated edge, and
(II) a right side elongated ledge being positioned to extend from the right side elongated edge to thereby be couplable with one or more portions of the right side wall of the engageable keyboard tray.

9. The keyboard containment system of claim 4 wherein the left side of the engageable keyboard including
(I) a left side elongated edge, and
(II) a left side elongated ledge being positioned to extend from the left side elongated edge to thereby be couplable with one or more portions of the left side wall of the engageable keyboard tray.

10. The keyboard containment system of claim 4 wherein the rear side of the engageable keyboard including
(I) a rear elongated edge, and
(II) a rear elongated ledge being positioned to extend from the left side elongated edge to thereby be couplable with one or more portions of the left side wall of the engageable keyboard tray.

11. The keyboard containment system of claim 4 wherein the rear wall of the engageable keyboard tray including
(I) a rear wall interior elongated edge, and
(II) a rear wall interior elongated ledge being positioned to extend from the rear wall interior elongated edge,
  (a) the rear wall interior elongated ledge including at least one rear wall interior notch being positioned to form a gap between a portion of the rear wall interior elongated edge of the engageable keyboard tray and a portion of the rear side of the engageable keyboard when the engageable keyboard is being coupled with the engageable keyboard tray.

12. The keyboard containment system of claim 4, wherein
(I) the right side wall of the engageable keyboard tray including a right side wall top notch, and
(II) the left side wall of the engageable keyboard tray including a left side wall top notch,
  (a) the right side wall top notch and the left side wall top notch positioned to receive at least one protrusion of a lower end of a tablet case.

13. The keyboard containment system of claim 4, wherein the front opening of the engageable keyboard tray including
(I) a front opening extension,
  (a) the front opening extension being couplable with a lower end of a stand for a tablet case.

14. An engageable keyboard for coupling with an engageable keyboard tray including a rectangular base with a right side wall, a rear wall, a left side wall, and a front opening extending perpendicularly therefrom, the engageable keyboard comprising:
(I) a front side, a right side, a rear side, and a left side,
  (A) the engageable keyboard being shaped and sized to be received by the engageable keyboard tray by a slidable insertion of the engageable keyboard through the front opening of the engageable keyboard tray in a first direction parallel to the rectangular base of the engageable keyboard tray, the first direction being parallel with the right side wall and the left side wall of the engageable keyboard tray,
  (B) the right side of the engageable keyboard including at least one of (1) at least one notch extending perpendicularly inward into the right side of the engageable keyboard and (2) at least one tab extending perpendicularly outward from the right side of the engageable keyboard,
(C) the right side of the engageable keyboard being couplable with the right side wall of the engageable keyboard tray
  (i) wherein when the right side wall of the engageable keyboard tray includes at least one notch extending perpendicularly inwardly into the right side wall of the engageable keyboard tray, the right side of the engageable keyboard includes the at least one tab extending perpendicularly outward from the right side of the engageable keyboard, and
  (ii) wherein when the right side wall of the engageable keyboard tray includes at least one tab extending perpendicularly from the right side wall of the engageable keyboard tray, the right side of the engageable keyboard includes the at least one notch extending perpendicularly inwardly into the right side of the engageable keyboard,
  (iii) wherein when the engageable keyboard tray is fully coupled with the engageable keyboard, wherein when the right side wall of the engageable keyboard tray includes at least one notch extending perpendicularly inwardly into the right side wall of the engageable keyboard tray, and wherein when the right side of the engageable keyboard includes the at least one tab extending perpendicularly outward from the right side of the engageable keyboard,
    (a) the at least one notch of the right side wall of the engageable keyboard tray is engaged with the at least one tab of the right side of the engageable keyboard,
    (b) the at least one notch of the right side wall of the engageable keyboard tray is extending inwardly into the right side wall of the engageable keyboard tray in a direction perpendicular to the first direction in which the engageable keyboard has been slidably inserted through the front opening of the engageable keyboard tray, and
    (c) the at least one tab of the right side of the engageable keyboard is extending outwardly from the right side of the engageable keyboard in a direction perpendicular to the first direction in which the engageable keyboard has been slidably inserted through the front opening of the engageable keyboard tray,
  (iv) wherein when the engageable keyboard tray is fully coupled with the engageable keyboard, wherein when the right side wall of the engageable keyboard tray includes at least one tab extending perpendicularly outward from the right side wall of the engageable keyboard tray, and wherein when the right side of the engageable keyboard includes the at least one notch extending perpendicularly inward into the right side of the engageable keyboard,
    (a) the at least one tab of the right side wall of the engageable keyboard tray is engaged with the at least one notch of the right side of the engageable keyboard,
    (b) the at least one tab of the right side wall of the engageable keyboard tray is extending outwardly from the right side wall of the engageable keyboard tray in a direction perpendicular to the first direction in which the engageable keyboard has been slidably inserted through the front opening of the engageable keyboard tray, and
    (c) the at least one notch of the right side of the engageable keyboard is extending inwardly into the right side of the engageable keyboard in a direction perpendicular to the first direction in which the engageable keyboard has been slidably inserted through the front opening of the engageable keyboard tray, and
(D) the left side of the engageable keyboard including at least one of (1) at least one notch extending perpendicularly inward into the left side of the engageable keyboard and (2) at least one tab extending perpendicularly outward from the left side of the engageable keyboard, and
(E) the left side of the engageable keyboard being couplable with the left side wall of the engageable keyboard tray,
  (i) wherein when the left side wall of the engageable keyboard tray includes at least one notch extending perpendicularly inwardly into the left side wall of the engageable keyboard tray, the left side of the engageable keyboard includes the at least one tab extending perpendicularly outward from the left side of the engageable keyboard, and
  (ii) wherein when the left side wall of the engageable keyboard tray includes at least one tab extending perpendicularly from the left side wall of the engageable keyboard tray, the left side of the engageable keyboard includes the at least one notch extending perpendicularly inwardly into the left side of the engageable keyboard,
  (iii) wherein when the engageable keyboard tray is fully coupled with the engageable keyboard, wherein when the left side wall of the engageable keyboard tray includes at least one notch extending perpendicularly inwardly into the left side wall of the engageable keyboard tray, and wherein when the left side of the engageable keyboard includes the at least one tab extending perpendicularly outward from the left side of the engageable keyboard,
    (a) the at least one notch of the left side wall of the engageable keyboard tray is engaged with the at least one tab of the left side of the engageable keyboard,
    (b) the at least one notch of the left side wall of the engageable keyboard tray is extending inwardly into the left side wall of the engageable keyboard tray in a direction perpendicular to the first direction in which the engageable keyboard has been slidably inserted through the front opening of the engageable keyboard tray, and
    (c) the at least one tab of the left side of the engageable keyboard is extending outwardly from the left side of the engageable keyboard in a direction perpendicular to the first direction in which the engageable keyboard has been slidably inserted through the front opening of the engageable keyboard tray,
  (iv) wherein when the engageable keyboard tray is fully coupled with the engageable keyboard, wherein when the left side wall of the engageable keyboard tray includes at least one tab extending perpendicularly outward from the left side wall of the engageable keyboard tray, and wherein when the left side of the engageable keyboard includes the at least one notch extending perpendicularly inward into the left side of the engageable keyboard,
- (a) the at least one tab of the left side wall of the engageable keyboard tray is engaged with the at least one notch of the left side of the engageable keyboard,
- (b) the at least one tab of the left side wall of the engageable keyboard tray is extending outwardly from the left side wall of the engageable keyboard tray in a direction perpendicular to the first direction in which the engageable keyboard has been slidably inserted through the front opening of the engageable keyboard tray, and
- (c) the at least one notch of the left side of the engageable keyboard is extending inwardly into the left side of the engageable keyboard in a direction perpendicular to the first direction in which the engageable keyboard has been slidably inserted through the front opening of the engageable keyboard tray.

15. The engageable keyboard of claim 14 wherein the rear side of the engageable keyboard being couplable with a rear wall of the engageable keyboard tray.

16. An engageable keyboard tray for coupling with an engageable keyboard including a front side, a right side, a rear side, and a left side, the engageable keyboard tray comprising:
- (I) a front opening, a right side wall, a rear wall, a left side wall, and a rectangular base, the rectangular base including a right side, a rear side, a left side opposite the right side, and a front side opposite the rear side, the right side wall, the rear wall, and the left side wall extending substantially perpendicularly from the right side, the rear side, and the left side of the rectangular base, respectively, the rectangular base without a wall extending from the front side of the rectangular base thereby forming the front opening to extend from the front side of the rectangular base with the front opening facing in a direction opposite and away from the rear wall,
  - (A) the engageable keyboard tray being shaped and sized to receive the engageable keyboard, by a slidable insertion of the engageable keyboard through the front opening of the engageable keyboard tray in a first direction parallel to the rectangular base of the engageable keyboard tray, the first direction being parallel with the right side wall and the left side wall of the engageable keyboard tray,
  - (B) the right side wall of the engageable keyboard tray including at least one of (1) at least one notch extending perpendicularly inwardly into the right side wall of the engageable keyboard tray and (2) at least one tab extending perpendicularly outward from the right side wall of the engageable keyboard tray,
  - (C) the right side wall of the engageable keyboard tray being couplable with the right side of the engageable keyboard,
    - (i) wherein when the right side of the engageable keyboard includes at least one notch extending perpendicularly inwardly into the right side of the engageable keyboard, the right side wall of the engageable keyboard tray includes the at least one tab extending perpendicularly outward from the right side wall of the engageable keyboard tray, and
    - (ii) wherein when the right side of the engageable keyboard includes at least one tab extending perpendicularly from the right side of the engageable keyboard, the right side wall of the engageable keyboard tray includes the at least one notch extending perpendicularly inwardly into the right side wall of the engageable keyboard tray,
    - (iii) wherein when the engageable keyboard tray is fully coupled with the engageable keyboard, wherein when the right side wall of the engageable keyboard tray includes the at least one notch extending perpendicularly inwardly into the right side wall of the engageable keyboard tray, and wherein when the right side of the engageable keyboard includes the at least one tab extending perpendicularly outward from the right side of the engageable keyboard,
      - (a) the at least one notch of the right side wall of the engageable keyboard tray is engaged with the at least one tab of the right side of the engageable keyboard,
      - (b) the at least one notch of the right side wall of the engageable keyboard tray is extending inwardly into the right side wall of the engageable keyboard tray in a direction perpendicular to the first direction in which the engageable keyboard has been slidably inserted through the front opening of the engageable keyboard tray, and
      - (c) the at least one tab of the right side of the engageable keyboard is extending outwardly from the right side of the engageable keyboard in a direction perpendicular to the first direction in which the engageable keyboard has been slidably inserted through the front opening of the engageable keyboard tray,
    - (iv) wherein when the engageable keyboard tray is fully coupled with the engageable keyboard, wherein when the right side wall of the engageable keyboard tray includes the at least one tab extending perpendicularly outward from the right side wall of the engageable keyboard tray, and wherein when the right side of the engageable keyboard includes the at least one notch extending perpendicularly inward into the right side of the engageable keyboard,
      - (a) the at least one tab of the right side wall of the engageable keyboard tray is engaged with the at least one notch of the right side of the engageable keyboard,
      - (b) the at least one tab of the right side wall of the engageable keyboard tray is extending outwardly from the right side wall of the engageable keyboard tray in a direction perpendicular to the first direction in which the engageable keyboard has been slidably inserted through the front opening of the engageable keyboard tray, and
      - (c) the at least one notch of the right side of the engageable keyboard is extending inwardly into the right side of the engageable keyboard in a direction perpendicular to the first direction in which the engageable keyboard has been slidably inserted through the front opening of the engageable keyboard tray, and
(D) the left side wall of the engageable keyboard tray including at least one of (1) at least one notch extending perpendicularly inwardly into the left side wall of the engageable keyboard tray and (2) at least one tab extending perpendicularly outward from the left side wall of the engageable keyboard tray,
(E) the left side wall of the engageable keyboard tray being couplable with the left side of the engageable keyboard,
  (i) wherein when the right side of the engageable keyboard includes at least one notch extending perpendicularly inwardly into the right side of the engageable keyboard, the right side wall of the engageable keyboard tray includes the at least one tab extending perpendicularly outward from the right side wall of the engageable keyboard tray, and
  (ii) wherein when the right side of the engageable keyboard includes at least one tab extending perpendicularly from the right side of the engageable keyboard, the right side wall of the engageable keyboard tray includes the at least one notch extending perpendicularly inwardly into the right side wall of the engageable keyboard tray,
  (iii) wherein when the engageable keyboard tray is fully coupled with the engageable keyboard, wherein when the right side wall of the engageable keyboard tray includes the at least one notch extending perpendicularly inwardly into the right side wall of the engageable keyboard tray, and wherein when the right side of the engageable keyboard includes the at least one tab extending perpendicularly outward from the right side of the engageable keyboard,
    (a) the at least one notch of the right side wall of the engageable keyboard tray is engaged with the at least one tab of the right side of the engageable keyboard,
    (b) the at least one notch of the right side wall of the engageable keyboard tray is extending inwardly into the right side wall of the engageable keyboard tray in a direction perpendicular to the first direction in which the engageable keyboard has been slidably inserted through the front opening of the engageable keyboard tray, and
    (c) the at least one tab of the right side of the engageable keyboard is extending outwardly from the right side of the engageable keyboard in a direction perpendicular to the first direction in which the engageable keyboard has been slidably inserted through the front opening of the engageable keyboard tray,
  (iv) wherein when the engageable keyboard tray is fully coupled with the engageable keyboard, wherein when the right side wall of the engageable keyboard tray includes the at least one tab extending perpendicularly outward from the right side wall of the engageable keyboard tray, and wherein when the right side of the engageable keyboard includes the at least one notch extending perpendicularly inward into the right side of the engageable keyboard,
    (a) the at least one tab of the right side wall of the engageable keyboard tray is engaged with the at least one notch of the right side of the engageable keyboard,
    (b) the at least one tab of the right side wall of the engageable keyboard tray is extending outwardly from the right side wall of the engageable keyboard tray in a direction perpendicular to the first direction in which the engageable keyboard has been slidably inserted through the front opening of the engageable keyboard tray, and
    (c) the at least one notch of the right side of the engageable keyboard is extending inwardly into the right side of the engageable keyboard in a direction perpendicular to the first direction in which the engageable keyboard has been slidably inserted through the front opening of the engageable keyboard tray.

17. The engageable keyboard tray of claim 16 wherein the rear wall of the engageable keyboard tray being couplable with the rear side of the engageable keyboard, wherein the rear wall of the engageable keyboard tray includes at least one rear wall interior notch to allow for a gap between at least one portion of the rear wall of the engageable keyboard tray and at least one portion of the rear side of the engageable keyboard when the rear wall of the engageable keyboard tray is coupled with the rear side of the engageable keyboard, and wherein the at least one rear wall interior notch extends along the rear wall of the engageable keyboard tray no more than one-tenth of the rear wall of the engageable keyboard tray.

18. A keyboard containment system for an electronic tablet computing device, the keyboard containment system comprising:
(I) an engageable keyboard including a front side, a right side, a rear side, and a left side;
(II) an engageable keyboard tray including a front opening, a right side wall, a rear wall, a left side wall, and a rectangular base, the rectangular base including a right side, a rear side, a left side opposite the right side, and a front side opposite the rear side, the right side wall, the rear wall, and the left side wall extending substantially perpendicularly from the right side, the rear side, and the left side of the rectangular base, respectively, the rectangular base without a wall extending from the front side of the rectangular base thereby forming the front opening to extend from the front side of the rectangular base with the front opening facing in a direction opposite and away from the rear wall,
(A) the engageable keyboard tray being shaped and sized to receive the engageable keyboard by a slidable insertion of the engageable keyboard through the front opening of the engageable keyboard tray in a first direction parallel to the rectangular base of the engageable keyboard tray, the first direction being parallel with the right side wall and the left side wall of the engageable keyboard tray,
(B) the right side wall of the engageable keyboard tray including at least one of (1) at least one notch extending perpendicularly inwardly into the right side wall of the engageable keyboard tray and (2) at least one tab extending perpendicularly outward from the right side wall of the engageable keyboard tray, the right side of the engageable keyboard including at least one of (1) at least one notch extending perpendicularly inwardly into the right side of the engageable keyboard and (2) at least one tab extending perpendicularly outward from the right side of the engageable keyboard, (C) the right side wall of the engageable keyboard tray being couplable with the right side of the engageable keyboard,
- (i) wherein when the right side wall of the engageable keyboard tray includes the at least one notch extending perpendicularly inwardly into the right side wall of the engageable keyboard tray, the right side of the engageable keyboard includes the at least one tab extending perpendicularly outward from the right side of the engageable keyboard, and
- (ii) wherein when the right side wall of the engageable keyboard tray includes the at least one tab extending perpendicularly from the right side wall of the engageable keyboard tray, the right side of the engageable keyboard includes the at least one notch extending perpendicularly inwardly into the right side of the engageable keyboard,
- (iii) wherein when the engageable keyboard tray is fully coupled with the engageable keyboard, wherein when the right side wall of the engageable keyboard tray includes the at least one notch extending perpendicularly inwardly into the right side wall of the engageable keyboard tray, and wherein when the right side of the engageable keyboard includes the at least one tab extending perpendicularly outward from the right side of the engageable keyboard,
  - (a) the at least one notch of the right side wall of the engageable keyboard tray is engaged with the at least one tab of the right side of the engageable keyboard,
  - (b) the at least one notch of the right side wall of the engageable keyboard tray is extending inwardly into the right side wall of the engageable keyboard tray in a direction perpendicular to the first direction in which the engageable keyboard has been slidably inserted through the front opening of the engageable keyboard tray, and
  - (c) the at least one tab of the right side of the engageable keyboard is extending outwardly from the right side of the engageable keyboard in a direction perpendicular to the first direction in which the engageable keyboard has been slidably inserted through the front opening of the engageable keyboard tray,
- (iv) wherein when the engageable keyboard tray is fully coupled with the engageable keyboard, wherein when the right side wall of the engageable keyboard tray includes the at least one tab extending perpendicularly outward from the right side wall of the engageable keyboard tray, and wherein when the right side of the engageable keyboard includes the at least one notch extending perpendicularly inward into the right side of the engageable keyboard,
  - (a) the at least one tab of the right side wall of the engageable keyboard tray is engaged with the at least one notch of the right side of the engageable keyboard,
  - (b) the at least one tab of the right side wall of the engageable keyboard tray is extending outwardly from the right side wall of the engageable keyboard tray in a direction perpendicular to the first direction in which the engageable keyboard has been slidably inserted through the front opening of the engageable keyboard tray, and
  - (c) the at least one notch of the right side of the engageable keyboard is extending inwardly into the right side of the engageable keyboard in a direction perpendicular to the first direction in which the engageable keyboard has been slidably inserted through the front opening of the engageable keyboard tray, and (D) the left side wall of the engageable keyboard tray including at least one of (1) at least one notch extending perpendicularly inwardly into the left side wall of the engageable keyboard tray and (2) at least one tab extending perpendicularly outward from the left side wall of the engageable keyboard tray, the left side of the engageable keyboard including at least one of (1) at least one notch extending perpendicularly inwardly into the left side of the engageable keyboard and (2) at least one tab extending perpendicularly outward from the left side of the engageable keyboard, and (E) the left side wall of the engageable keyboard tray being couplable with the left side of the engageable keyboard,
- (i) wherein when the left side wall of the engageable keyboard tray includes the at least one notch extending perpendicularly inwardly into the left side wall of the engageable keyboard tray, the left side of the engageable keyboard includes the at least one tab extending perpendicularly outward from the left side of the engageable keyboard, and
- (ii) wherein when the left side wall of the engageable keyboard tray includes the at least one tab extending perpendicularly from the left side wall of the engageable keyboard tray, the left side of the engageable keyboard includes the at least one notch extending perpendicularly inwardly into the left side of the engageable keyboard,
- (iii) wherein when the engageable keyboard tray is fully coupled with the engageable keyboard, wherein when the left side wall of the engageable keyboard tray includes the at least one notch extending perpendicularly inwardly into the left side wall of the engageable keyboard tray, and wherein when the left side of the engageable keyboard includes the at least one tab extending perpendicularly outward from the left side of the engageable keyboard,
  - (a) the at least one notch of the left side wall of the engageable keyboard tray is engaged with the at least one tab of the left side of the engageable keyboard,
  - (b) the at least one notch of the left side wall of the engageable keyboard tray is extending inwardly into the left side wall of the engageable keyboard tray in a direction perpendicular to the first direction in which the engageable keyboard has been slidably inserted through the front opening of the engageable keyboard tray, and
  - (c) the at least one tab of the left side of the engageable keyboard is extending outwardly from the left side of the engageable keyboard in a direction perpendicular to the first direction in which the engageable keyboard has been slidably inserted through the front opening of the engageable keyboard tray,
(iv) wherein when the engageable keyboard tray is fully coupled with the engageable keyboard, wherein when the left side wall of the engageable keyboard tray includes the at least one tab extending perpendicularly outward from the left side wall of the engageable keyboard tray, and wherein when the left side of the engageable keyboard includes the at least one notch extending perpendicularly inward into the left side of the engageable keyboard,
(a) the at least one tab of the left side wall of the engageable keyboard tray is engaged with the at least one notch of the left side of the engageable keyboard,
(b) the at least one tab of the left side wall of the engageable keyboard tray is extending outwardly from the left side wall of the engageable keyboard tray in a direction perpendicular to the first direction in which the engageable keyboard has been slidably inserted through the front opening of the engageable keyboard tray, and
(c) the at least one notch of the left side of the engageable keyboard is extending inwardly into the left side of the engageable keyboard in a direction perpendicular to the first direction in which the engageable keyboard has been slidably inserted through the front opening of the engageable keyboard tray;
(III) a tablet case including a lower end, a front, and a back,
(A) the front of the tablet case including a front interior surface, a lower interior surface, a left side, an upper side, and a right side
(B) the lower interior surface, the left side, the upper side, and the right side of the tablet case extending from the front interior surface to form a rectangular container couplable with the electronic tablet computing device as placed into the rectangular container from the front of the tablet case; and
(IV) a stand including
(A) a lower portion with a lower end,
(B) an upper portion, with an upper end, and
(C) a flexible hinge being coupled between the lower portion and the upper portion,
(i) the lower end of the lower portion of the stand being coupled to the rectangular base of the engageable keyboard tray, and
(ii) the upper end of the upper portion of the stand being coupled to the back of the tablet case.

19. The keyboard containment system of claim 18 wherein
(I) the front opening of the engageable keyboard tray including a front opening extension, the front opening extension extending rearwardly from the rectangular base,
(a) the lower end of the lower portion of the stand being coupled to the rectangular base of the engageable keyboard tray via being coupled to the front opening extension.

20. The keyboard containment system of claim 18, wherein
(I) the right side wall of the engageable keyboard tray including a right side wall top notch,
(II) the left side wall of the engageable keyboard tray including a left side wall top notch, and
(III) the lower end of the tablet case including at least one protrusion,
(a) the right side wall top notch and the left side wall top notch being positioned to receive the at least one protrusion of the lower end of the tablet case.

21. The keyboard containment system of claim 18, wherein
(I) the engageable keyboard including a communication connector, and
(II) the lower end of the tablet case including a lower interior surface including an aperture, the lower end of the tablet case couplable with the communication connector of the engageable keyboard via the aperture of the lower interior surface of the tablet case, the aperture being sized, shaped, and positioned to receive the communication connector of the engageable keyboard.

* * * * *